United States Patent [19]
De Negris et al.

[11] 4,201,046
[45] May 6, 1980

[54] BURNER NOZZLE ASSEMBLY FOR GAS TURBINE ENGINE

[75] Inventors: Michael A. De Negris, Wolcott; Philip Lees, South Windsor, both of Conn.

[73] Assignee: United Technologies Corporation, Hartford, Conn.

[21] Appl. No.: 864,677

[22] Filed: Dec. 27, 1977

[51] Int. Cl.² ............................................... F02C 7/22
[52] U.S. Cl. ..................................... 60/39.37; 60/747
[58] Field of Search ............ 60/39.36, 39.37, 39.74 R, 60/39.74 B; 239/406, 424

[56] References Cited

U.S. PATENT DOCUMENTS

| 2,956,404 | 10/1960 | Kassner et al. | 60/39.36 |
| 3,026,048 | 3/1962 | Gascoigne | 239/424 |
| 3,028,102 | 4/1962 | Davies et al. | 60/39.74 B |
| 3,403,510 | 10/1968 | Lauck | 60/39.74 R |
| 3,763,650 | 10/1973 | Hussey et al. | 60/39.74 B |
| 4,009,569 | 3/1977 | Kozlin | 60/39.37 |

FOREIGN PATENT DOCUMENTS 1020989  2/1953  France ................................. 60/39.36

Primary Examiner—Robert E. Garrett
Attorney, Agent, or Firm—McCormick, Paulding & Huber

[57] ABSTRACT

An axial flow gas turbine engine has a combustion section with a number of nozzle assemblies for injecting fluent materials, such as fuel, combustion enhancers, or pollutant reducers, into a burner which is supplied with air from the combustion section plenum. The nozzle assemblies are carried by a wall separating the plenum from the outside of the engine and extend from the wall to associated openings in the burner can. The nozzle head and an associated feeder tube is easily removable from the remainder of each nozzle assembly for cleaning, repair or replacement of the nozzle head, or for other purposes. The nozzle assemblies and their supply manifolds are further arranged so that a central liner of the burner can may be removed through the wall without disturbing the nozzle assemblies or the supply manifolds. Also, the wall is provided by a member removably attached to the engine case or frame and supporting the nozzle assemblies and the burner can liner, so that by a more complete procedure all of the nozzle assemblies, and the burner can liner, may be entirely removed from the engine, if desired.

10 Claims, 7 Drawing Figures

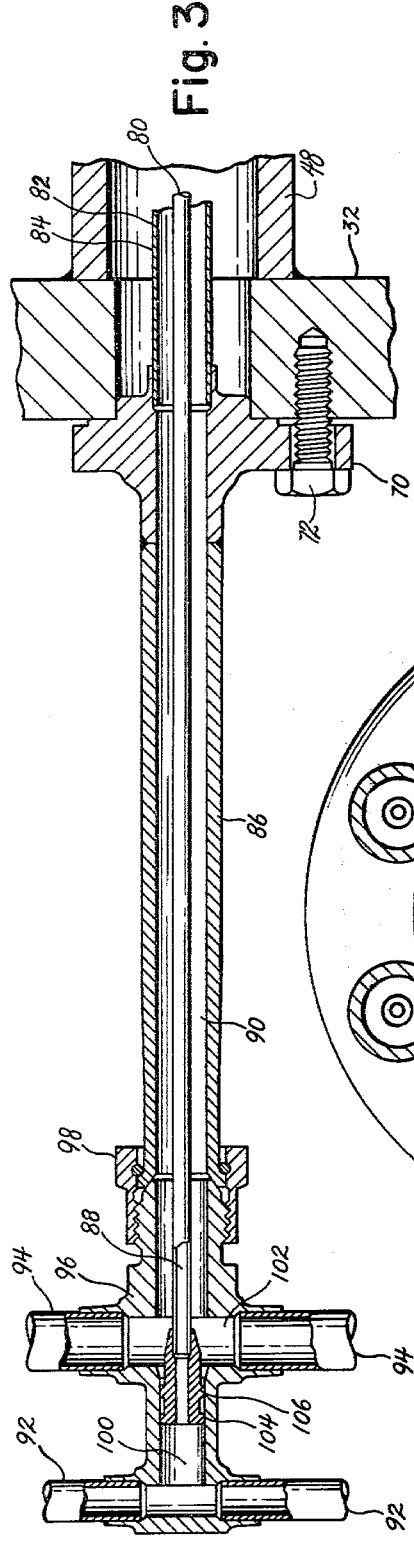
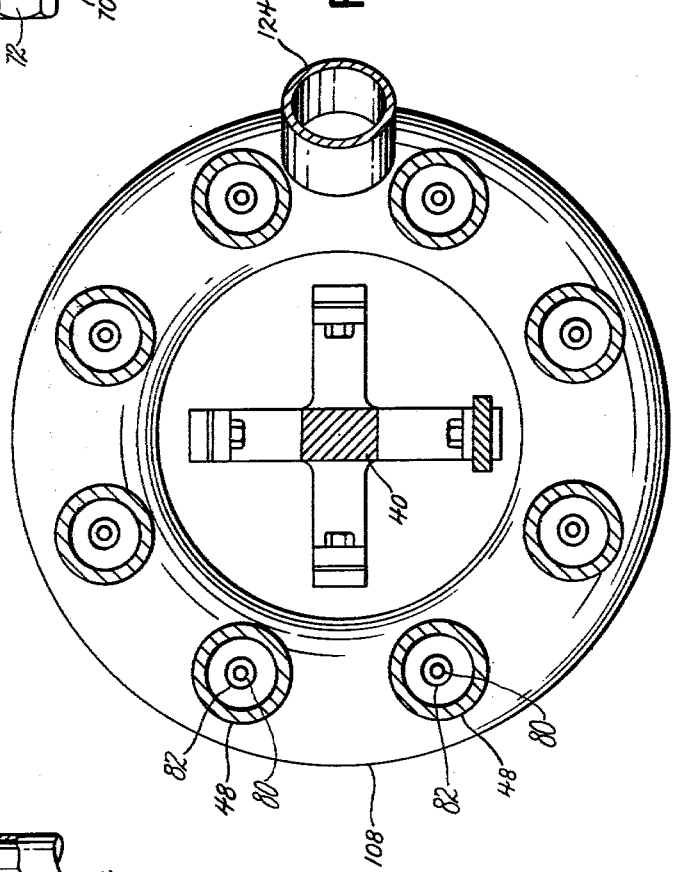
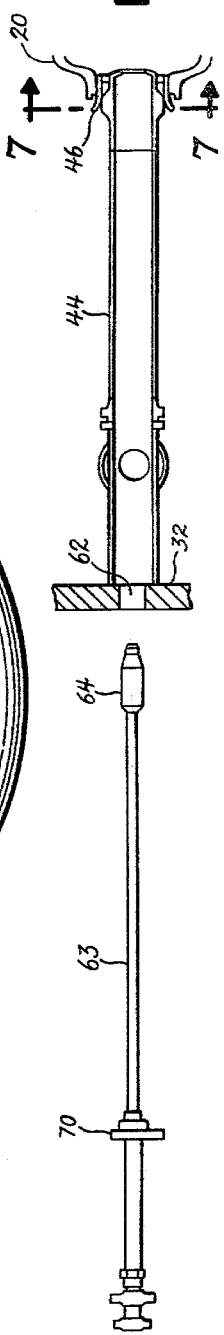

BURNER NOZZLE ASSEMBLY FOR GAS TURBINE ENGINE

BACKGROUND OF THE INVENTION

This invention relates to gas turbine engines, and deals more particularly with the construction of a nozzle assembly for supplying fluent materials to a burner can and with the manner in which a plurality of such nozzle assemblies are combined with a single burner can and with associated parts of the engine to facilitate removal of various parts from the engine for cleaning, repair or replacement or to provide repair or inspection access to other less easily removed engine parts.

The nozzle construction and arrangement of this invention may be used with various different models of gas turbine engines each having a compressor section, a combustion section, and a turbine section and each being of the type wherein the combustion section includes a plenum containing at least one burner can receiving air from the plenum and to which one or more fuels or other fluent materials are supplied to support combustion with the air in the can. In the following description and the accompanying drawings, however, the engine to which the invention is applied is taken to be one similar to that shown in U.S. Pat. Nos. 3,991,562, 4,009,569 and 4,016,718, all assigned to the assignee of this application, to which reference is made for further details of the engine construction not repeated in this application.

In the operation of a gas turbine engine it is often necessary or desirable, when changing from one mode of operation to another, to vary the injection of fuel or other fluent material into the burner cans. For example, during starting it may be desirable to inject one fuel and during normal running to inject another or an additional fuel. Or, during starting it may be desirable to have the fuel injected into the burner can in one spray pattern and during normal running of the engine to have it injected with a different spray pattern. Along with the fuel or fuels it may also be desirable to inject water, steam, or other materials to enhance combustion or to reduce the amount of pollutants in the exhaust gases. Also, the nozzle heads of any nozzle assemblies used in a gas turbine usually require frequent inspection since they are subject to clogging due to coking or the catching of foreign particles contained in the fluent material passing therethrough.

The general object of this invention is, therefore, to provide a nozzle assembly for a gas turbine engine whereby a number of different fluent materials may be supplied, at separate times or simultaneously, to the nozzle head for injection into an associated burner can and/or by means of which different spray patterns may be obtained, the nozzle head nevertheless being relatively easily removable from the engine for inspection and for cleaning, repair, or replacement, if necessary.

Another object of this invention is to provide a plurality of nozzle assemblies of the foregoing character for each burner can of the engine and which plurality of nozzle assemblies is so arranged relative to the other parts of the engine and to the associated supply manifolds as to permit removal of the central liner of the associated burner can without disturbing the nozzle assemblies and their supply manifolds.

A still further object of this invention is to provide a plurality of nozzle assemblies which are mounted on a removable wall member of the engine and which may be entirely removed from the engine along with the wall member for inspection or repair and to provide a relatively large access opening for reaching other parts of the engine located in the combustion section.

Other objects and advantages of the invention will be apparent from the drawings and from the following description.

SUMMARY OF THE INVENTION

The invention resides in a nozzle assembly for supplying fluent materials to an associated burner can of a gas turbine engine, the assembly having a tubular housing extending between a wall of the engine and the burner can and also having an elongated tubular feeder with an inboard and an outboard portion. At its free end the inboard portion of the feeder carries a nozzle head slidably received in the tubular housing and positioned to spray fluent material supplied to it into the burner can. The outboard end of the feeder extends outwardly from the wall and is connected with a supply of fluent material. Intermediate its length the feeder includes a flange or other means sealing the associated opening in the wall and releasably connected to the wall, so that when the flange or similar means is released from the wall the feeder and the associated nozzle head may be removed from the engine by sliding the feeder endwise away from the wall, thereby withdrawing the nozzle head from its tubular housing.

The invention also resides in the feeder being comprised of two concentric pipes providing two separate feeder passageways for conducting fluent material to the nozzle head, and it also resides in a means for supplying fluent material to the annular passage defined between the tubular housing and the feeder, the nozzle head having a means permitting such fluent material to flow past the nozzle head from the passage to the burner can.

The invention further resides in there being a plurality of nozzle assemblies for a burner can with the assemblies being arranged in an annular array and with their fluent material supply manifolds being of an annular shape so as to permit the central liner of the burner can to be removed from the engine without disturbing the nozzle assemblies and their supply manifolds.

BRIEF DESCRIPTION OF THE DRAWINGS

FIG. 3 is an enlarged longitudinal sectional view of the left hand end portion of the nozzle assembly shown in FIG. 2.

FIG. 5 is a sectional view taken on the line 5—5 of FIG. 1.

FIG. 6 is a reduced scale view generally similar to to FIG. 2 but showing the feeder and nozzle head removed from the tubular housing of the nozzle assembly.

DETAILED DESCRIPTION OF THE PREFERRED EMBODIMENT

Figure 1:
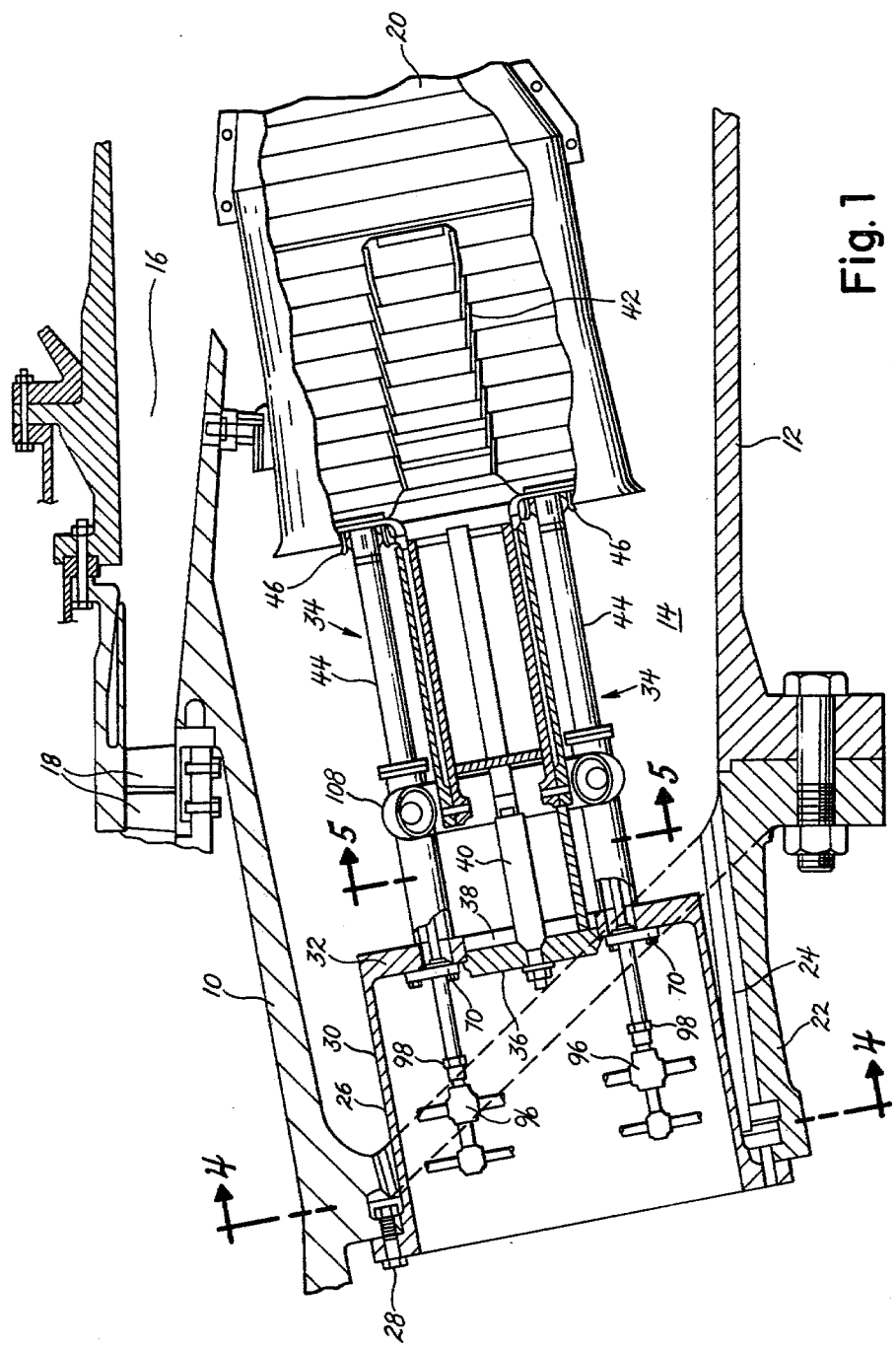
FIG. 1 is a fragmentary sectional view taken on a plane passing through the longitudinal axis of a gas turbine engine embodying this invention and showing a portion of the combustion section of said engine.

Turning to the drawings and first considering FIG. 1, this figure shows a portion of the combustion section of a gas turbine engine, the illustrated parts of the engine including an annular diffuser-burner case 10 and an annular plenum cover 12 defining part of an annular plenum 14. The plenum 14 receives high pressure air delivered to it by an annular duct 16 forming a diffuser for the compressor section of the engine, the illustrated stator vanes 18, 18 being part of the last compressor stage, and contains a number of burner cans, such as the one indicated at 20. Air from the plenum enters the burner cans and is there burned with fuel to provide combustion gases delivered to the turbine section of the engine located to the right of the parts shown in FIG. 1.

As disclosed by the aforementioned patents, the instant engine has eight burner cans similar to the illustrated can 20 and each of these cans together with the associated parts shown in FIG. 1 are generally identical to one another.

As shown in FIG. 1, the illustrated burner can 20 is associated with a dormer portion 22 of the diffuser-burner case 10 with the dormer portion providing a relatively large aperture 24 communicating with the plenum 14. The aperture 24 is closed by a recessed or cup-shaped aperture cover 26 which is releasably fastened to the diffuser-burner case by a plurality of threaded fasteners such as the one shown at 28. The cover 26 has a cylindrical side wall 30 and a bottom wall 32.

Figure 4:
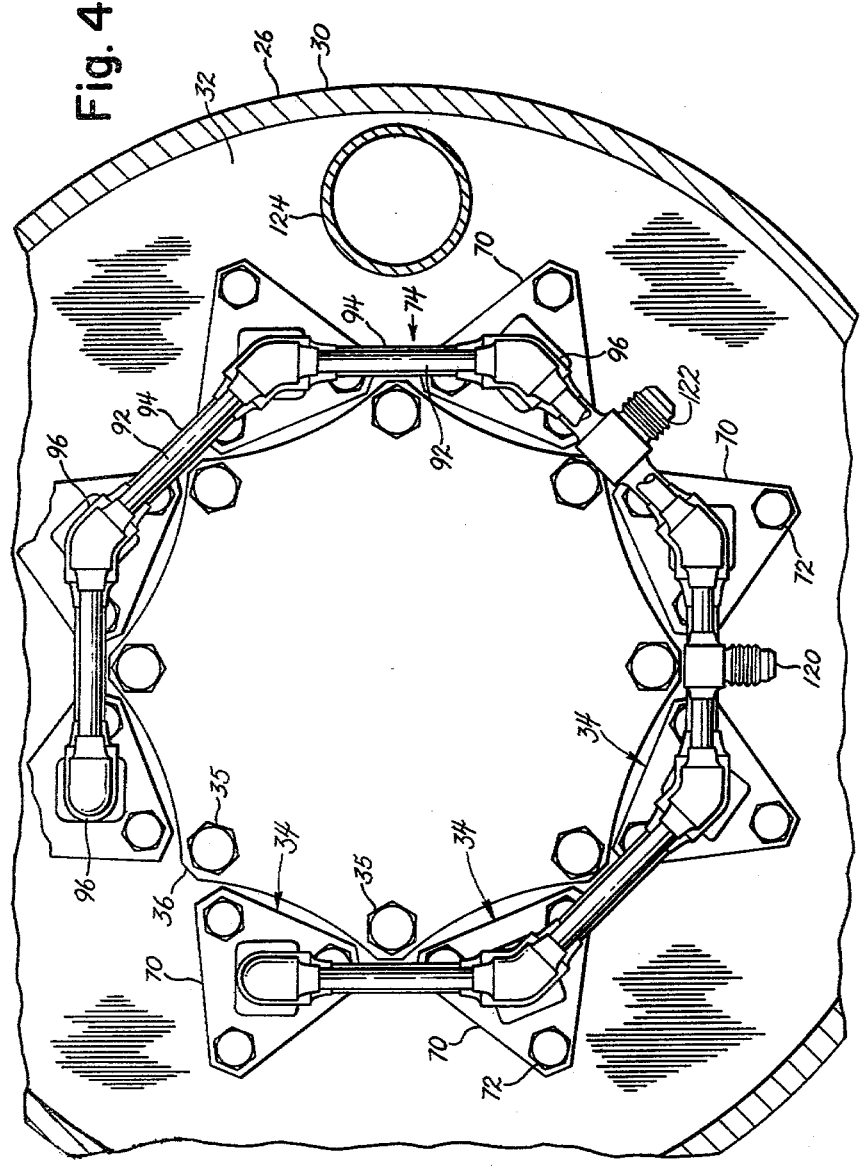
FIG. 4 is an enlarged view taken on the line 4—4 of FIG. 1.

Fastened to the wall 32 are a plurality of nozzle assemblies, indicated generally at 34, 34, which extend between the wall 32 and the burner can 20 and serve to supply fuel and/or other fluent materials to the burner can to support the combustion process which occurs therein. Also connected to the bottom wall 32, by a plurality of threaded fasteners 35, 35 as shown in FIG. 4, is a cover plate 36 which normally seals a central opening 38 in the wall. Supportingly fixed to the cover plate 36 is a supporting structure 40 which extends between the plate and the center tube or liner 42 of the burner can 20. The liner 42 is connected to the supporting structure 40 and unconnected to other parts of the burner can 20 so that when the threaded fasteners 35, 35 are removed from the cover plate 36, the supporting structure 40 and the liner 42 may be removed from the engine by moving the plate 36 to the left in FIG. 1 thereby sliding the supporting structure and the liner out of the engine through the opening 38 in the bottom wall 32.

Figure 7:
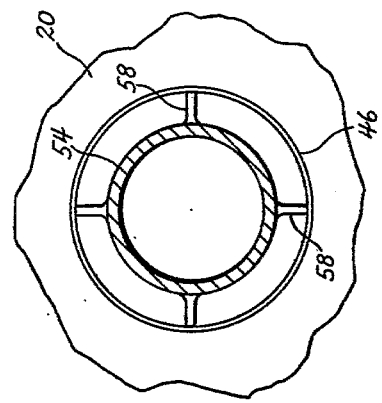
FIG. 7 is a sectional view taken on the line 7—7 of FIG. 6.
Figure 2:
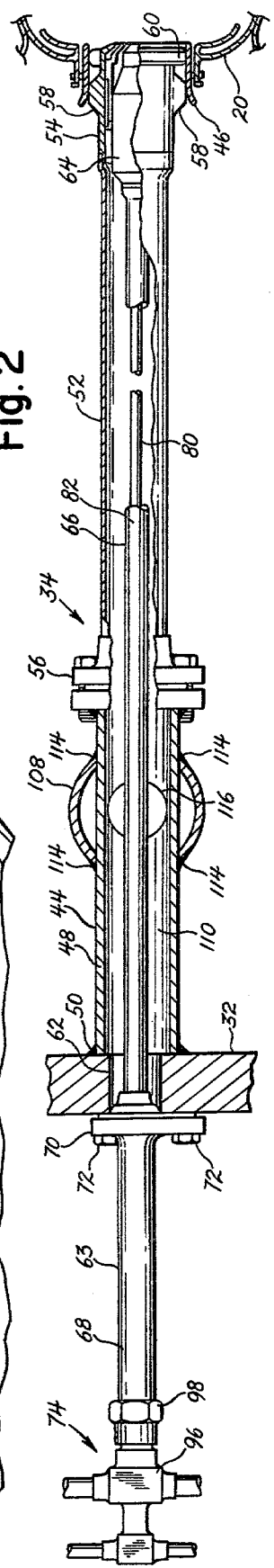
FIG. 2 is a view partly in longitudinal section and partly in side elevation showing in more detail one of the nozzle assemblies of FIG. 1.

Referring to FIGS. 2 and 3, each nozzle assembly 34 has a tubular housing 44 which is fixed to the bottom wall 32 of the cover 26 and which extends between that wall and an associated opening in the burner can 20 defined by an annular socket 46 fixed to the can. The tubular housing 44 is comprised of a relatively thick walled tubular section 48 welded to the wall 32, as indicated at 50, a relatively thin walled tubular section 52, and a tubular nose section 54. The sections 48 and 52 are connected to one another by a set of flanges and threaded fasteners, as indicated at 56, and the sections 52 and 54 are connected to one another by welding. The nose section 54 is slidably received in the associated burner can socket 46 and has a plurality of spacing fins 58, 58 which, as seen best in FIG. 7, center the nose section 58 in the socket 46 while permitting air to flow from the plenum 14 into the burner can 20 between the socket and the nose section. Mounted on the very end of the nose section 54 is a swirler ring 60 for swirling the air which does enter the burner can 20 through the socket 46.

The tubular housing 44 of the nozzle assembly, as shown in FIG. 2, at its left hand end is aligned with and surrounds an opening 62, in the wall 32, aligned with the burner can opening provided by the socket 46. Passing through the opening 62 is an elongated feeder 63 which supplies fluent material to a nozzle or spray head 64 received in the nose section 54 of the tubular housing adjacent the burner can 20. The feeder 63 has an inboard portion 66 received in the tubular housing 44 and an outboard portion 68 extending outwardly of the wall 32 in the direction away from the plenum 14. The feeder also includes a radially extending flange 70 which normally seals the opening 62 in the wall 32 and is releasably connected to the wall by three headed screws 72, 72 passing through the flange and threaded into the wall 32. Releasably connected to the outboard end of the outboard portion 68 of the feeder is a first fuel manifold, indicated generally at 74, which, as explained in more detail hereinafter, separately supplies fluent material to two different passageways extending through the feeder from the manifold 74 to the nozzle head 64.

The nozzle head 64 is slidably received in the tubular housing 44 and has a maximum outside diameter less than the minimum inside diameter of the tubular housing and less than the diameter of the opening 62 in the wall 32 so that when the manifold 74 is removed from the feeder and the screws 72, 72 are removed from its flange 70, the feeder and the attached nozzle head 64 may be removed from the engine by shifting the feeder end-wise to the left in FIG. 2 to thereby withdraw the inboard feeder portion 66 and the nozzle head 64 from the tubular housing as shown in FIG. 6.

The feeder 63, as best shown in FIGS. 2 and 3, preferably consists of two concentric pipes 80 and 82. The inner pipe 80 is a unitary member extending the full length of the feeder from the nozzle head 64 to the manifold 74; and the outer pipe 82 is comprised of an inboard member 84, extending from the wall 32 to the nozzle head 64, and an outboard member 86 connected to the inboard member 84, providing the flange 70 and extending from the wall 32 to the manifold 74. The bore 88 of the inner pipe 80 provides one passageway from the manifold 74 to the nozzle head and the annular space 90 between the inner pipe 80 and the outer pipe 82 provides a second such passageway.

The manifold 74 includes a primary supply line or conduit 92 and a secondary supply line or conduit 94. These supply lines are connected individually to the two passageways in the feeder as shown in FIG. 3. More particularly, for each nozzle assembly the supply manifold 74 includes a connector body 96 threadably connected to the outer end of the feeder by a union nut 98. The connector body 96 has a bore, concentric with the bores of the feeder pipes 80 and 82, defining an outer chamber 100 connected to the primary supply line 92 and an inner chamber 102 connected to the secondary supply line 94. Between the outer chamber 100 and the inner chamber 102 the connector body bore has a cylindrical seal section 104 which slidably receives a conforming cylindrical head 106 on the outer end of the inner pipe 80, thereby sealing the outer chamber 100 from the inner chamber 102 and causing the chamber 100 to communicate exclusively with the bore 88 of the inner pipe 80 and the inner chamber 102 to communicate exclusively with the annular passageway 90.

The internal structure of the nozzle head 64 may vary widely without departing from the invention and is not shown in detail. It will be understood, however, that the bore 88 of the inner tube 80 communicates with one set of discharge ports in the free or right hand end of the nozzle head to cause the material supplied to the nozzle head by the bore 88 to be sprayed into the burner can with one type of spray pattern and that the annular passageway 90 of the feeder communicates with another set of discharge ports in the free or right hand end of the nozzle head to cause the material supplied to the nozzle head by the annular passageway 90 to be sprayed into the burner can with another spray pattern. The manifold 74 may supply the same or different material through the two passageways 88 and 90, and at different times in the operation of the engine either one or the other or both of the passageways may be used to supply material to the burner can. Generally, the fluent material supplied by either the passageway 88 or the passageway 90 will be a fuel such as fuel oil.

In addition to the fluent material supplied to the nozzle head by the passageways 88 and 90 the nozzle assembly 34 also may inject a third fluent material supplied by a toroidal supply manifold 108 to the annular passage 110 between the outside of the outer pipe 82 of the feeder and the inside of the tubular housing 44. The nozzle head 64 includes means, such as grooves or flutes on its outside surface, permitting the fluid in the annular passage 110 to flow past it into the burner can 20 and the nose portion 54 of the tubular housing may also include vanes or the like cooperating with the nozzle head 64 to impart a desired spray pattern to this fluent material. This fluent material may be any one of a wide variety of materials, but is preferably steam which acts to enhance the combustion occurring in the burner and to also reduce the amount of pollutants contained in the exhaust gases.

As shown in FIG. 4 there are eight nozzle assemblies 34,34 associated with illustrated burner can 20 of FIG. 1 all of which are attached to the bottom wall 32 of the recessed aperture cover 26 by their flanges 70, 70 and attachment screws 72, 72. The eight nozzle assemblies are further arranged in an annular array around the cover plate 36 and have their longitudinal axes parallel to one another and parallel to the central axis of the cover plate 36 and of the center tube or liner 42 of the burner can. As shown in FIG. 5, the manifold 108 for supplying steam or other fluent material to the passages 110, 110 of the nozzle assemblies is a toroidal member having a central opening 110 large enough to accommodate the burner tube liner 42 and its supporting structure 40. Each nozzle assembly has the thick walled part 48 of its tubular housing passing through the toroidal member as shown in FIG. 5. Each part 48 is welded to the manifold 108, as shown in FIG. 2 and indicated at 114, and each part 48 has at least one opening 116 providing communication between the bore of the manifold 108 and the associated passage 110.

The supply manifold 74, as shown in FIG. 4, is also annular in shape, so as to surround the cover plate 36. It includes the primary supply line 92, made of a number of tubular segments extending between the various connector bodies 96, 96 of the nozzle assemblies, and the secondary supply line 94, also made of a number of tubular segments extending between the various connector bodies 96, 96. The primary supply line has an inlet fitting 120 and the secondary supply line 94 has an inlet fitting 122. A supply conduit 124 is fixed to the recessed aperture cover 26, passes through its bottom wall 32, and is connected to the manifold 108 as shown in FIG. 5 to supply fluent material to that manifold.

From the foregoing, it will, therefore, be understood that the construction and arrangement of the nozzle assemblies 34, 34 is such that the center tube or liner 42 of the burner can and its supporting structure 40 may be removed from the engine without disturbing the nozzle assemblies or their manifolds 74 and 108 by removing the screws 35, 35 from the cover plate 36 and by then shifting the cover plate to the left in FIG. 1 to withdraw the supporting structure and the liner 42 through the hole 38 in the bottom wall 32. Also, the feeder 63 and nozzle head 64 of each nozzle assembly may be removed from the engine by loosening all eight union nuts 98, 98 and removing the supply manifold 74, by removing the screws 72, 72 holding the nozzle feeder in place, and by then shifting the feeder to the left in FIG. 2 to withdraw the feeder and the nozzle head 64 from the tubular housing 44 as shown in FIG. 6. Still further, if desired, the fasteners 28, 28 holding the recessed aperture cover 26 in place may be removed, after which the cover 26 may be shifted to the left to withdraw it, the tubular housings 44, 44 of the nozzle assemblies and the toroidal supply manifold 108 from the engine, making the nozzle assemblies 34, 34 available in their entirety for cleaning, inspection, repair, etc., and also providing, by way of the dormer opening 24, a relatively large access area to reach other internal parts of the engine.

We claim:

1. In an axial flow gas turbine engine having a combustion section, the combination comprising: means defining a plenum for said combustion section, at least one burner can in said plenum having a forward end with a nozzle opening, said plenum defining means including a wall spaced forwardly of said burner can and having a nozzle opening aligned with said nozzle opening of said burner can, and a nozzle assembly for injecting fluent materials into said burner can through said nozzle opening thereof, said nozzle assembly including a tubular housing in said plenum fixed to said wall and extending from said wall to said burner can, said tubular housing having a bore communicating with both of said nozzle openings and having a straight central axis generally colinear with the axis of said nozzle openings, a nozzle head slidably received in said tubular housing in the vicinity of said nozzle opening of said burner can for spraying fluent material into said burner can, an elongated feeder passing through said nozzle opening in said wall for conducting fluent material to said nozzle head, means releasably connecting said feeder to said wall and sealing said nozzle opening therein, said feeder having an inboard tubular portion fixed to said nozzle head and extending through said tubular housing from said wall to said nozzle head and said feeder also having an outboard tubular portion communicating with said inboard portion and extending from said wall in the direction away from said plenum, said inboard portion of said feeder having an external diameter substantially smaller than the internal diameter of said tubular housing so as to define a passage therebetween, means defining a flow path for fluent material past said nozzle head from said passage to the interior of said burner can, a first fluent material supply conduit, means releasably connecting said first fluent material supply conduit to said outboard portion of said feeder to supply a first fluent material to said feeder, and another fluent material supply conduit passing through and fixed to said wall and communicating with said passage between said inboard feeder portion and said tubular housing to supply another fluent material from outside said plenum to said passage, said nozzle head having a cross-sectional shape smaller than that of the bore of said tubular housing and of said nozzle opening in said wall so that when said means releasably connecting said feeder to said wall and said means releasably connecting of said first fluent material supply to said outboard portion of said feeder are released said feeder and said nozzle head may be removed by withdrawing them axially from said tubular housing through said nozzle opening in said wall.

2. The combination defined in claim 1 further characterized by said feeder including two concentric pipes providing two separate feeder passageways for conducting fluent material from the outboard end of said feeder to said nozzle head, said first fluent material supply conduit being communicatively connected to one of said feeder passageways by said means releasably connecting said first fluent material supply conduit to said outboard portion of said feeder, a second fluent material supply conduit, and means releasably connecting said second fluent material supply conduit to said outboard portion of said feeder and providing communication between said second fluent material supply conduit and the other of said feeder passageways.

3. In an axial flow gas turbine engine having a combustion section, the combination comprising: means defining a plenum for said combustion section, at least one burner can in said plenum having a forward end with a nozzle opening, said plenum defining means including a wall spaced forwardly of said burner can and having a nozzle opening aligned with said nozzle opening of said burner can, and a nozzle assembly for injecting fluent materials into said burner can through said nozzle opening thereof, said nozzle assembly including a tubular housing in said plenum fixed to said wall and extending from said wall to said burner can, said tubular housing having a bore communicating with both of said nozzle openings and having a straight central axis generally colinear with the axis of said nozzle openings, a nozzle head slidably received in said tubular housing in the vicinity of said nozzle opening of said burner can for spraying fluent material into said burner can, an elongated feeder passing through said nozzle opening in said wall for conducting fluent material to said nozzle head, means releasably connecting said feeder to said wall and sealing said nozzle opening therein, said feeder having an inboard tubular portion fixed to said nozzle head and extending through said tubular housing from said wall to said nozzle head and said feeder also having an outboard tubular portion communicating with said inboard portion and extending from said wall in the direction away from said plenum, said inboard portion of said feeder having an external diameter substantially smaller than the internal diameter of said tubular housing so as to define a passage therebetween, means defining a flow path for fluent material past said nozzle head from said passage to the interior of said burner can, a first fluent material supply, and means releasably connecting said first fluent material supply to said outboard portion of said feeder, said nozzle head having a cross-sectional shape smaller than that of the bore of said tubular housing and of said nozzle opening in said wall so that when said means releasably connecting said feeder to said wall and said means releasably connecting said first fluent material supply to said outboard portion of said feeder are released said feeder and said nozzle head may be removed by withdrawing them axially from said tubular housing through said nozzle opening in said wall, said feeder including two concentric pipes providing two separate feeder passageways for conducting fluent material from the outboard end of said feeder to said nozzle head, said first fluent material supply including a means providing a primary supply of fluent material and a means providing a secondary supply of fluent material, and said means releasably connecting said first fluent material supply to said outboard portion of said feeder including means connecting said primary supply to one of said two feeder passageways and connecting said secondary supply to the other of said two feeder passageways, said two concentric pipes of said feeder being a central pipe the bore of which provides a first one of said two feeder passageways and a second pipe surrounding said central pipe to define an annular space therebetween which constitutes a second one of said two feeder passageways, said central pipe at the outboard end of said feeder extending axially outwardly beyond the adjacent end of said second pipe, said means for releasably connecting said feeder to said first fluent material supply including a connector body having a bore with an axis colinear with the axis of said two concentric pipes, said bore having an axially outer chamber connected to said primary supply of material, an axially inner chamber connected to said secondary supply of material, and a cylindrical seal section between said inner and outer chambers slidably and sealably receiving the end portion of said central pipe to cause the bore of said central pipe to communicate with said outer chamber and to isolate said outer chamber from said inner chamber, and means releasably connecting said connector body to said second pipe with said annular passage in communication with said inner chamber.

4. The combination defined in claim 3 further characterized by said means releasably connecting said feeder to said wall and sealing said nozzle opening therein comprising a flange on said second pipe extending radially from said second pipe into overlying relationship with the portion of said wall surrounding said nozzle opening therein, and a plurality of threaded fasteners passing through said flange and threadably engaged with said wall to hold said feeder to said wall and whereby said feeder may be released from said wall by removing said threaded fasteners.

5. The combination defined in claim 1 further characterized by said plenum defining means including a generally annular case surrounding the central axis of said engine, said tubular housing being axially slidably received in said nozzle opening of said burner can, said wall being provided by a wall member separate from said case, and means releasably connecting said wall member to said case so upon release of said latter means said wall member and said tubular housing and said another fluent material supply conduit may be removed as a unit from said case and said burner can be shifting said wall member and said tubular housing along the axis of said tubular housing.

6. In an axial flow gas turbine engine having a combustion section, the combination comprising: means defining a plenum for said combustion section; at least one burner can in said plenum having a forward end with a plurality of nozzle openings, said plenum defining means including a generally annular case surrounding the central axis of said engine and a wall spaced forwardly of said burner can and having a plurality of nozzle openings respectively aligned with said nozzle openings of said burner can; a plurality of nozzle assemblies for injecting fluent materials into said burner can through said nozzle openings thereof, each of said nozzle assemblies including a tubular housing in said plenum fixed to said wall and extending from said wall to said burner can between an associated pair of said nozzle openings in said wall and in said burner can, said tubular housing having a bore communicating with both of its associated nozzle openings and having a straight central axis generally colinear with the axis of said associated nozzle openings, a nozzle head slidably received in said tubular housing in the vicinity of the associated nozzle opening of said burner can for spraying fluent material into said burner can, an elongated feeder passing through the associated nozzle opening in said wall for conducting fluent material to said nozzle head, means releasably connecting said feeder to said wall and sealing said associated nozzle opening therein, said feeder having an inboard tubular portion fixed to said nozzle head and extending through said tubular housing from said wall to said nozzle head and said feeder also having an outboard tubular portion communicating with said inboard portion and extending from said wall in the direction away from said plenum, said inboard portion of said feeder having an external diameter smaller than the internal diameter of said tubular housing so as to define a passage therebetween, and means defining a flow path for fluent material past said nozzle head from said passage to the interior of said burner can; a first fluent material supply manifold, means releasably connecting said first manifold to said outboard portions of said feeder of all of said plurality of nozzle assemblies; a second fluent material supply manifold located within said plenum and fixed to said wall; and means connecting said second manifold to said passages of all of said nozzle assemblies, the nozzle head of each of said nozzle assemblies having a cross-sectional shape smaller than that of the bore of its associated tubular housing and of the associated nozzle opening in said wall so that when said means releasably connecting said feeders to said wall and said means releasably connecting said first manifold to said outboard portions of said feeders are released said feeders and said nozzle heads can be removed by withdrawing them axially from the associated tubular housings through the associated nozzle openings in said wall.

7. The combination defined in claim 6 further characterized by each of said tubular housings of said nozzle assemblies being axially slidably received in its associated nozzle opening of said burner can, said wall being provided by a wall member separate from said case, and means releasably connecting said wall member to said burner case.

8. The combination defined in claim 6 further characterized by said burner can having a central liner separate from the remainder thereof, said wall having an access opening through which said central liner of said burner can may be removed, a cover for said access opening, cover connecting means releasably connecting said cover to said wall, means extending between said cover and said burner liner supportingly fixing said central liner to said cover whereby upon release of said cover connecting means said central liner may be withdrawn from said burner can and case by moving said cover axially away from said wall, said nozzle openings in said wall and said nozzle assemblies received therein being arranged in an annular array surrounding said cover, and said first manifold being generally annular in shape and surrounding said cover so that when said cover connecting means is released said cover and said central liner can be removed from said case and said remainder of said burner can without disturbing said nozzle assemblies or said first manifold.

9. The combination defined in claim 8 further characterized by said second manifold being a toroidal tubular member located in said plenum with its axis colinear with that of said annular array of nozzle assemblies and having a central opening large enough to permit said central liner to pass therethrough, each of said tubular housings of said nozzle assemblies being fixed to said toroidal member and having an opening providing communication between the interior of said toroidal member and said passage of the associated nozzle assembly.

10. The combination defined in claim 6 further characterized by said feeder of each of said nozzle assemblies including two concentric pipes providing first and second feeder passageways for conducting fluent material from the outboard end of said feeder to its associated nozzle head, and said first manifold comprising a primary manifold connected with said first feeder passageways of said feeders for supplying a primary fluent material to said first passageways and a secondary manifold connected with said second feeder passageways of said feeders for supplying a secondary fluent material to said second passageways.

* * * * *